W. C. CORMACK.
BAND SAW BRAZING CLAMP.
APPLICATION FILED OCT. 16, 1920.
1,407,188.
Patented Feb. 21, 1922.
2 SHEETS—SHEET 1.
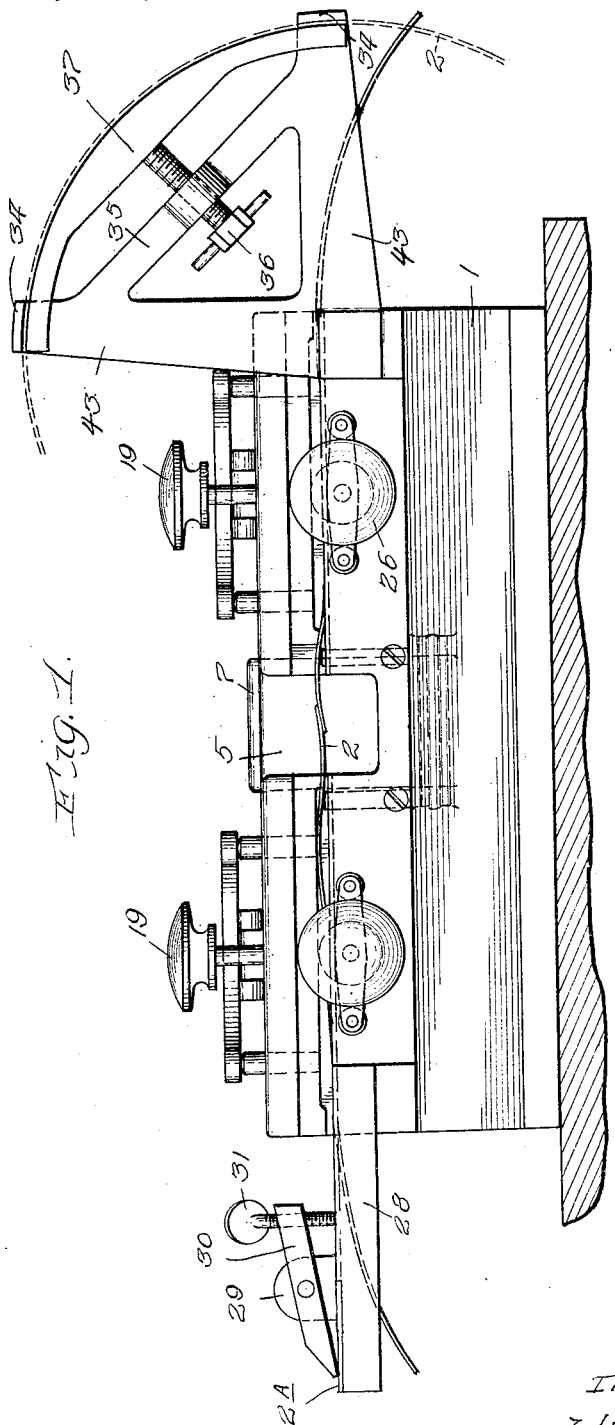
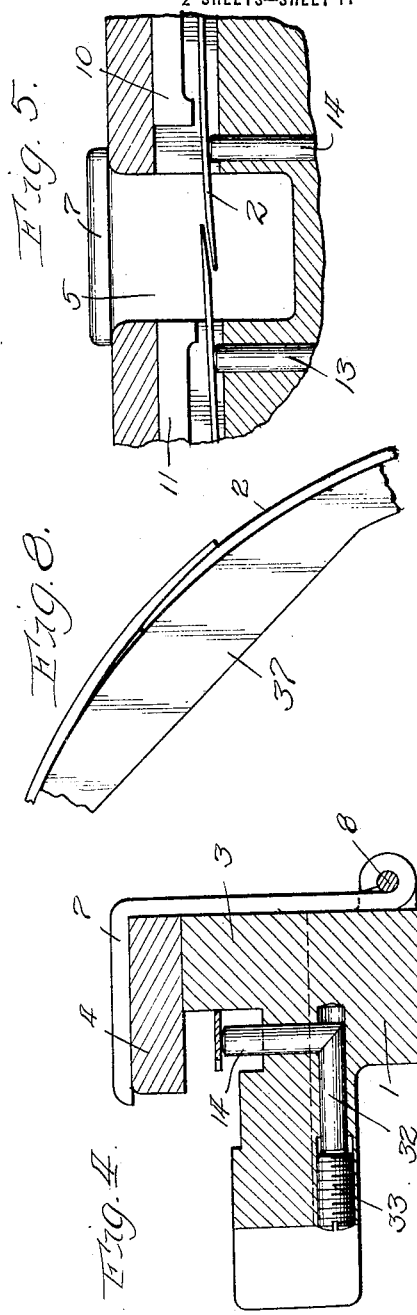
Witness:
R. R. Tarrington
Inventor:
William C. Cormack
by Albert Scheible
Attorney

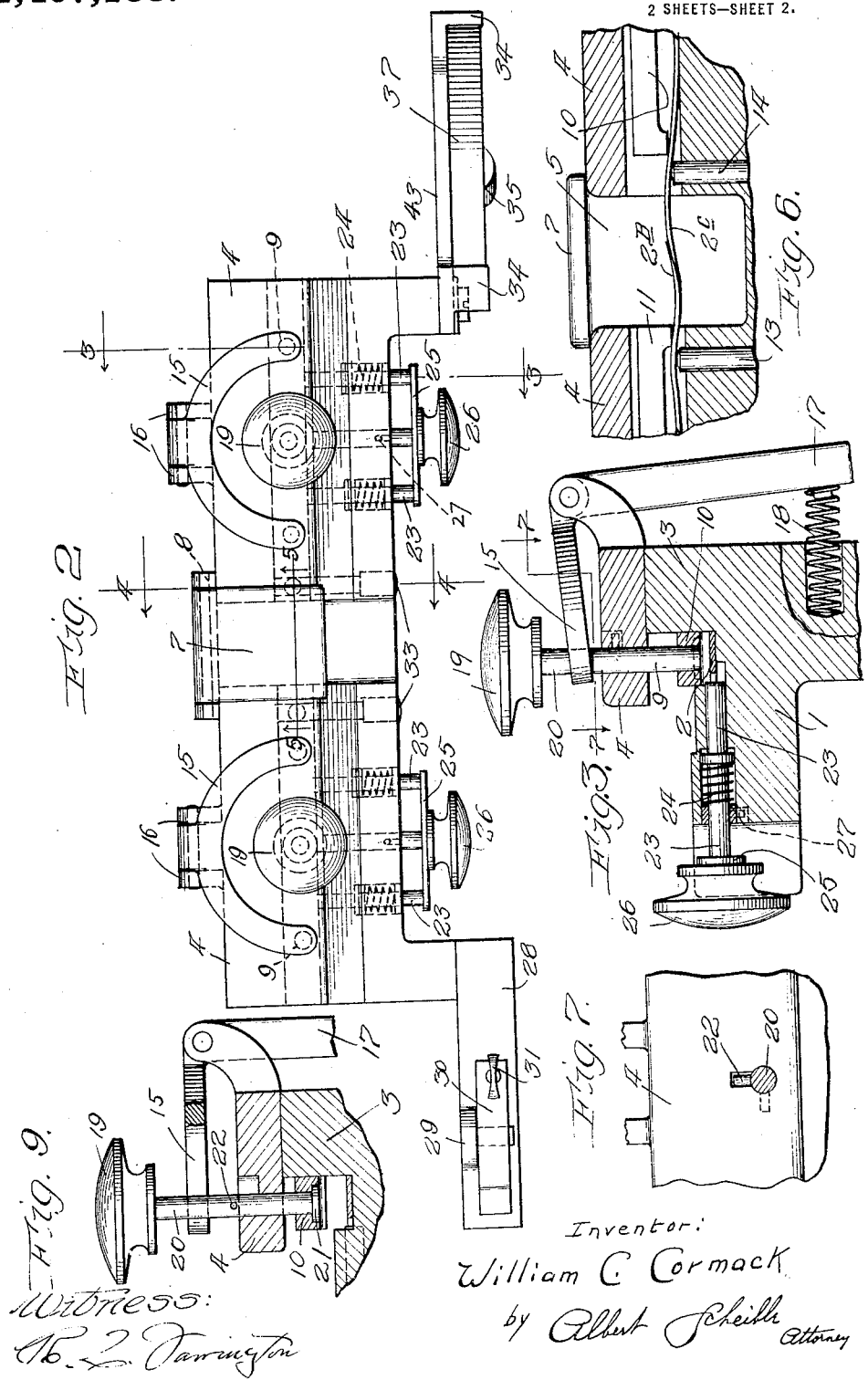

UNITED STATES PATENT OFFICE.

WILLIAM C. CORMACK, OF CHICAGO, ILLINOIS.

BAND-SAW BRAZING CLAMP.

1,407,188.

Specification of Letters Patent.   Patented Feb. 21, 1922.

Application filed October 16, 1920.   Serial No. 417,479.

*To all whom it may concern:*

Be it known that I, WILLIAM C. CORMACK, citizen of the United States, residing at Chicago, in the county of Cook and State of Illinois, have invented certain new and useful Improvements in a Band-Saw Brazing Clamp; and I do hereby declare the following to be a full, clear, and exact description of the invention, such as will enable others skilled in the art to which it appertains to make and use the same.

My invention relates to appliances for use in connection with the joining of the ends of band saws, being particularly suitable for use where the two ends of a saw strip are to be brazed to each other. Generally speaking, my invention aims to provide an appliance for this purpose which will facilitate the chamfering of the ends of the saw strip, which will hold the ends in suitable position within a flame-confining chamber during the brazing operation, which will readily enable the user to force the tips of these ends into proper overlapping relation prior to the brazing, and which will facilitate the proper thinning of the resulting joint. Moreover, my invention aims to provide means for all of these purposes in a single comparatively simple and inexpensive contrivance which can easily be mounted on a bench or table and which will permit the operator to use the different portions of the appliance speedily and without much change in his position.

In one of its more particular aspects, my invention aims to provide a simple and quickly operable clamp for holding the free end of a saw strip firmly while its tip is being chamfered, and preferably for effecting this holding in such a position that the resulting chamfered tip can speedily be shifted to the position which it is to occupy during the brazing operation. In another aspect, my invention aims to provide simple, effective and easily operable means for holding the saw strip with its tips disposed within a brazing chamber in suitable overlapping relation and with the adjacent portions of the saw in exact edgewise alinement; to provide simple means for forcing the tips of the strip into a firm overlapping and for holding them thus overlapped during the brazing operation, and to provide simple and quickly operable means for thereafter releasing the completed band from the appliance.

In still another aspect, my invention aims to provide simple and conveniently located means for clamping the brazed joint of the band upon a suitably curved surface, so as to facilitate the filing down of the joint as thickened during the brazing operation. Still other and more detailed objects will appear from the following specification and from the accompanying drawings, in which—

Fig. 1 is a front elevation of an appliance embodying my complete invention.

Fig. 2 is a plan view of the same.

Fig. 3 is an enlarged vertical section through the same embodiment, taken along the correspondingly numbered zigzag line of Fig. 2.

Fig. 4 is a similar transverse vertical section taken along the correspondingly numbered line of Fig. 2, or through one of the cam-operated means which force the overlapping tips of the saw strip into firm engagement with each other.

Fig. 5 is a fragmentary and enlarged vertical section through the brazing chamber and adjacent parts, taken along the correspondingly numbered line of Fig. 2, and showing the two tips of the strip as they appear when first inserted in the brazing chamber.

Fig. 6 is a section similar to Fig. 5, showing the disposition of the tips after they have been forced into a firm overlapping by the cam-operated means employed for this purpose.

Fig. 7 is a fragmentary horizontal section taken along the correspondingly numbered line in Fig. 3 and showing the arrangement for holding one of the clamp-lifting plungers in its raised position.

Fig. 8 is an enlarged front elevation of a portion of the clamp illustrated at the right hand end of Fig. 1, showing the position of the brazed joint when this part of my appliance is used during the thinning down of the joint.

Fig. 9 is a view similar to Fig. 3 showing the parts in a different position.

In the embodiment of the drawings, my appliance includes a supporting member 1 having on its upper face a longitudinal groove adapted to receive a saw strip 2 in flatwise horizontal position, as illustrated in Fig. 3. Back of this groove, the supporting member has a back 3 extending to a height considerably above the bottom of this groove, so as to afford a support for a horizontal ledge 4 which extends forwardly from the back 3 and which overhangs the groove in which the saw strip is adapted to be seated. The ledge 4 is desirably formed in two parts longitudinally spaced from each other as shown in Figs. 5 and 6, so as to present an intervening gap which forms part of a brazing chamber 5 extending downwardly across the aforesaid groove and considerably below the latter. This chamber normally has its top partly inclosed by a hood 7 hinged on a pin 8 to a bracket which is disposed at the back of the supporting member 1, thus allowing this hood to be swung back out of the way for enabling the user to see the exact position of the saw parts prior to the brazing operation. However, the hood preferably leaves the entire front of the chamber 5 open, so that the hot blast from a blow torch can readily be projected into the chamber from the front of the appliance.

Slidably mounted in each of the two longitudinally spaced ledge portions 4 are a pair of vertical plungers 9, and the two plungers associated with each of the ledge portions are suitably secured at their lower ends to one of two clamping plates 10 and 11 which take the thrust of the cam-operated plungers 13 and 14 as hereafter described. Each of the plungers 9 is engaged at its upper end by one arm of a fork 15 forming part of a rocking lever pivoted on an ear 16 forming a rear portion of the adjacent ledge 4. This lever has its other arm 17 extending downwardly behind the appliance and continuously urged towards the rear of the latter by a compression spring 18 as shown in Fig. 3, so that this spring continuously acts through the said lever and the plungers for cooperating with gravity in tending to force the adjacent clamping plate 10 or 11 downwardly. However, each such clamping plate can be raised and maintained in a raised position by lifting the knob 19 of a stem 20 which extends vertically through both the said clamping plate and the adjacent ledge portion 4 and which has a head 21 recessed in the lower face of the clamping plate. This stem has fastened to it a pin 22 projecting horizontally from the stem and normally entering a vertical slot or keyway in the ledge 4 adjacent to this stem as shown in Fig. 6, and by partially rotating the knob 19 after the stem 20 has been lifted, the pin 22 is caused to ride upon the top of the ledge 4 to hold the stem and the associated cam plate lifted in spite of the downward thrust exerted both by gravity and the spring-pressed lever which acts through the plunger 9.

When both of the cam plates 10 and 11 have been locked in their raised positions after the manner just described, the central portion of my appliance leaves a clear opening as shown in Fig. 5 for the insertion of the saw strip from the front of the appliance, so that the two end portions of the strip can be slipped respectively into the left hand and right hand portions of the said horizontal groove. As soon as the strip portions have thus been slipped into the groove with their tips projecting beyond each other within the brazing chamber 5 to the desired extent, these strip portions are clamped against the back 3 by a pair of plungers 23, each of which is normally pressed against an edge of the saw strip by a spring 24. These plungers 23 are desirably arranged in pairs, one pair being opposite each of the vertical stems 20, and the plungers 23 of each pair are connected by a cross-bar 25 to a handle 26 for enabling the plungers to be drawn back against the action of the springs 24. When each pair of plungers has thus been withdrawn, the handle 26 associated therewith can be rotated, thereby also rotating the stem of the handle and bringing a laterally projecting locking pin 27 out of the slot or keyway which normally houses the same (as shown in Fig. 3), so that this pin 27 can bear against the forward face of the support 1 to hold the plungers 23 in their retracted positions during the insertion or withdrawal of the saw strip.

Before inserting the strip ends into the chamber, each tip is desirably chamfered so as to decrease the thickness of the resulting joint. For this purpose, I desirably equip the support 1 with a projection 28 having a riser 29 which forms a pivot for a clamping lever 30. This lever has one end inclined downwardly towards a groove in which the saw strip 2$^A$ is adapted to be inserted, as shown at the left hand of Fig. 1. This tip of the lever may be forced to clamp the strip against the ledge 28 by a hand screw 31 threaded through the other end of the lever 30 and engaging the saw strip, so that this screw simultaneously tightens the clamps and helps to hold the saw strip rigidly gripped. With the tip of the saw strip thus clamped, it is an easy matter for the operator to file the tip down to the desired chamfer. When this has been done for each end of the strip, the latter is in convenient position for having its free end portions inserted in the brazing chamber after the manner heretofore described.

While clamping the two ends of the strip edgewise at some distance from their extreme tips, the operator leaves these strip ends extending loosely between the clamping plates 10 and 11 and the plungers 13 and 14, after the manner of Fig. 5, merely being careful to secure the desired overlapping between the tips of the saw strip and to have that free end of the saw uppermost which has the adjacent tip of the clamping plate associated therewith between it and the opposed plunger. That is to say, the two clamping plates 10 and 11 do not extend equally towards the brazing chamber 5, but each of the same has a downward projection at the end directed towards the brazing chamber. In the illustrated embodiment, this downward projection on the clamping plate 11 is disposed between the plunger 13 and the brazing chamber, so that an approaching of this plunger to the clamping plate will cause the interposed portion 2$^B$ of the saw strip to rock downwardly within the brazing chamber. On the other hand, the companion plunger 14 is disposed between this chamber and the downwardly projecting tip of the other clamping plate 10, so that an approaching of the plunger 14 to the clamping plate will cause the other strip end 2$^C$ to rock upwardly. Consequently, if the tip 2$^B$ was originally above the other tip, such a relative movement of the plunger with respect to the adjacent clamping plates will force the overlapped strip ends into firm engagement with each other.

When the saw strip is placed in position, the plungers 13 and 14 may both project somewhat above the groove in which the saw rests and with which these plungers are alined, so that the downward pressure exerted by the two cam plates when the knobs 19 have been turned to release the same will tend to deflect the tip of the saw strips into the desired engagement with each other. If this is not sufficient, the action may be increased by lifting one or both of the plungers 13 and 14, for which purpose I desirably provide cam-actuated means under control of the operator. For instance, Fig. 4 shows the lower end of one of these plungers as cut off along a plane oblique to the front of the appliance and engaging a corresponding oblique surface on a horizontal thrust pin 32 which can be slid towards the axis of the plunger 14 by tightening a screw 33, and which pin will be slid back by the weight of the adjacent plunger 14 when this screw is returned. The screw 33 therefore cooperates with the thrust pin 32 and the plunger 14 in affording cam means for flexing the adjacent end of the saw strip, so that the two screws 33 readily enable the operator to secure and maintain the desired firm contacting of the tips of the strip during the brazing operation, at which time the hood 7 is in its normal position as illustrated in the drawings.

As soon as the brazing has been effected, the hood 7 is tipped back out of the way, and the knobs 19 and 26 are retracted and locked in their retracted positions, thereby releasing the grip on the saw and permitting the formerly inclosed portion of the latter to be withdrawn from the main portion of my appliance. The brazed part is then shifted to the clamp shown at the right hand of Fig. 1, which can readily be done without having the operator materially change his position. This clamp includes a pair of diverging arms 43 fast upon the supporting member 1 and each having at its tip a forwardly directed lug 34. The arms 43 are spanned by a cross-bar 35 through which a hand screw 36 is threaded, and this screw engages a clamping plate 37 which extends adjacent to both of the lugs 34 and which has its outer face convexed substantially to the curvature of the pulleys over which the finished saw is to be run when the band saw is in operation. By tightening the screw 36 after the proper portion of the saw has been slipped in position between the curved clamping plate 37 and the lugs 34, the raised joint portion of the saw can readily be disposed in the desired curved formation, as shown more clearly in Fig. 8 thus presenting the joint in a position in which it can easily and quickly be filed down to substantially uniform thickness with the rest of the saw.

It will be obvious from the above that my appliance readily lends itself to the speedy and effective consummation of all three of the operations involved in joining the ends of a band saw, and that these operations can be effected without any great change in the operator's position, thereby saving both time and steps. Moreover, by making the knobs 19 and 26 of a heat insulator, such as wood, I enable the operator to use my appliance continuously without either discomfort or delays, as he will not be bothered by the heat conveyed to the movable parts from the brazing chamber. Moreover, by clamping both saw ends against the alined forward face portions of the back 3, I insure an exact alining of the saw ends edgewise of the saw and am therefore able to produce a perfectly straight-sided band, which has not been possible with the appliance heretofore used for such purposes.

However, while I have illustrated and described the various features of my appliance in substantially unitary combination, and in a highly desirable embodiment, I do not wish to be limited to the use of the different features in this combination. Neither do I wish to be limited to the various details of construction and arrangement here disclosed, it being obvious that the same might be modified in many ways without departing from the spirit of my invention or from the appended claims.

I claim as my invention:

1. A band saw brazing appliance comprising means for holding the two ends of the saw in spaced overlapping relation to each other, and two other means respectively engaging the two ends of the saw back of the tips of said ends for forcing the said ends flatwise against each other.

2. A band saw brazing appliance comprising means for holding the two tips of the saw in freely spaced overlapping relation to each other, and relatively cooperating means engaging saw portions intermediate of the holding means and arranged for forcing the overlapping tips into flatwise contact and for holding them in such contacting relation during the brazing operation.

3. In a band saw brazing appliance, means for holding the saw with its two ends in relatively overlapping relation and with each tip free to be moved by a flatwise flexing of the saw back of the said tip, and two cam means respectively arranged for the flatwise bending of the two saw ends.

4. A band saw brazing appliance comprising means for holding the two ends of the saw in overlapping relation to each other, a plunger extending transversely of the face of the saw and engaging the latter at a distance from the tip of one end, and cam arranged for moving the plunger to cause the latter to flex the saw.

5. In an appliance for holding a band saw while brazing the latter, means for gripping each free end of the saw at a distance from its tip; and separate means disposed nearer to the tips than the said gripping means, for flexing the saw ends.

6. An appliance as per claim 5, in which the gripping means are arranged for gripping the saw edgewise.

7. An appliance as per claim 5, in which each of the said separate flexing means comprises a pair of relatively movable members engaging opposite sides of the saw at different distances from the tip.

8. An appliance as per claim 5, in which each of the said separate flexing means comprises a pair of relatively movable members engaging opposite sides of the saw at different distances from the tip, and yielding means for pressing one of the said members towards the saw.

9. An appliance as per claim 5, in which each of the said separate flexing means comprises a pair of relatively movable members engaging opposite sides of the saw at different distances from the tip, and cam means for pressing one of the said members towards the saw.

10. In an appliance for use in brazing a saw, means for gripping an end portion of the saw at a distance from its grip, a fulcrum disposed between the tip of the said end portion and the said gripping means and about which the saw is adapted to be flexed flatwise, and means engaging the saw at a distance from the fulcrum for effecting such flexing.

11. A structure as per claim 10, in which the last named means are disposed between the fulcrum and the tip of the said saw end.

12. A structure as per claim 10, in which the last named means are disposed between the fulcrum and the gripping means.

13. In a saw brazer's appliance, two fulcrums respectively engaged flatwise by the two saw ends, and means for flexing the two saw ends in respectively opposite directions about the two fulcrums.

14. In a saw brazer's appliance, two fulcrums respectively engaged flatwise by the two saw ends, and means for flexing the two saw ends in respectively opposite directions about the two fulcrums, the fulcrums and the flexing means being so arranged that the flexing of the saw ends will force the overlapping tips of these ends flatwise against each other.

15. A band saw brazing appliance comprising means for holding the two end portions of the saw with their tips in freely spaced overlapping relation to each other, means respectively engaging the two end portions of the saw back of the tips of said ends for forcing the said ends flatwise against each other, and handles of heat-insulating material associated with all of the said means for controlling the operation thereof.

Signed at Chicago, Illinois, October 12th, 1920.

WILLIAM C. CORMACK.